Sept. 16, 1969          D. M. PHILLIPS          3,466,772
RESILIENT RETAINING MEANS
Filed May 25, 1967          2 Sheets-Sheet 2
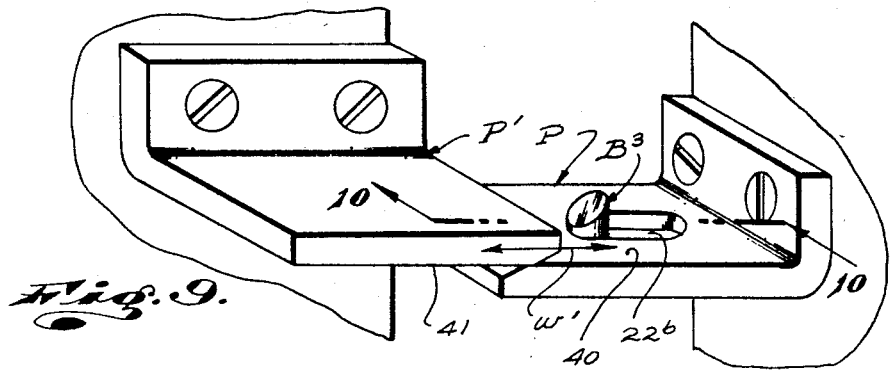
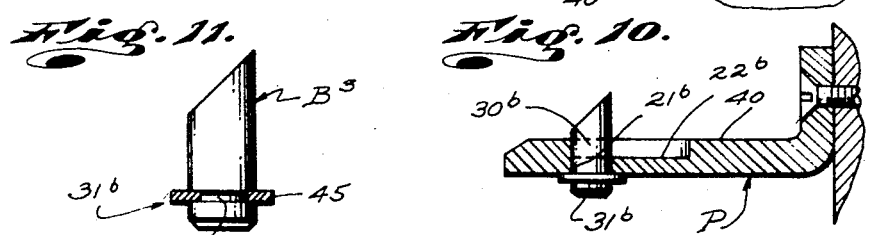
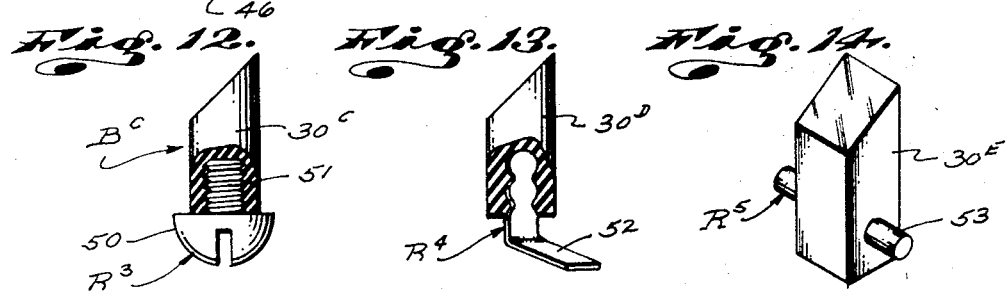
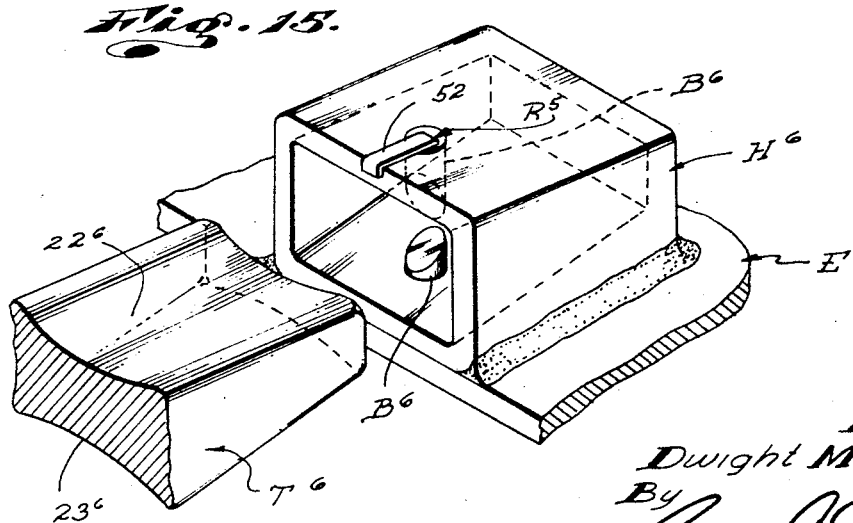
Inventor
Dwight M. Phillips
By
Attorney

United States Patent Office 3,466,772
Patented Sept. 16, 1969

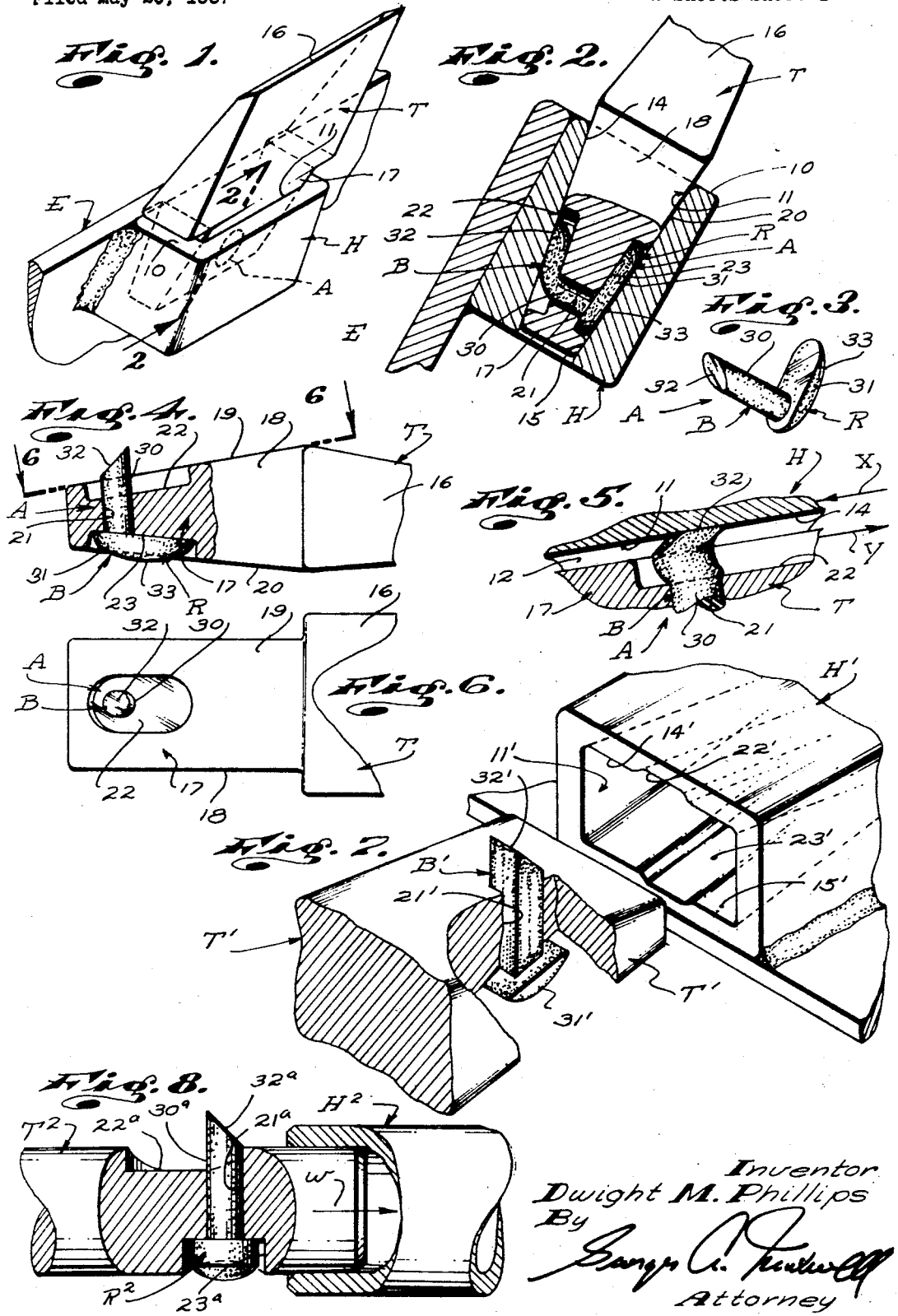

3,466,772
RESILIENT RETAINING MEANS
Dwight M. Phillips, Placentia, Calif. (% Corona Forge Company, 14200 E. 6th St., Corona, Calif. 91720)
Continuation-in-part of application Ser. No. 375,439, June 16, 1964. This application May 25, 1967, Ser. No. 641,261
Int. Cl. E02f *9/28, 3/36;* B25g *3/10*
U.S. Cl. 37—142                    12 Claims

ABSTRACT OF THE DISCLOSURE

A resilient gripping means to yieldingly prevent relative movement between two relatively shiftable parts along a predetermined line of travel including an opening in one part substantially normal to said line of travel, an elongate rubber block engaged in said opening and having an ungular gripping portion projecting outwardly from said one part with its oblique end surface disposed outwardly and longitudinally in one direction along said line of travel, said gripping portion adapted to be engaged by the other part upon movement of said other part in the other direction along said line of travel relative to said first part whereby said end portion is bent over between said parts and said end surface establishes substantially flat pressure frictional engagement on said other part and yieldingly resists movement of said other part in said one direction relative to said one part.

---

This application is a continuation-in-part of the application of Dwight M. Phillips, Ser. No. 375,439, filed June 16, 1964, now Patent No. 3,334,431, and entitled "Digger Tooth Construction."

This invention has to do with an improved resilient retaining means and is more particularly concerned with such a means for releasably, resiliently retaining a pair of relatively shiftable parts with opposing juxtapositioned surfaces.

Throughout the several mechanical and industrial arts there are many situations where two elements of a mechanical device are arranged in bearing engagement with each other and where it is desired that the parts, while separable, be releasably secured together to prevent or inhibit relative movement in a given direction and resulting separation therebetween. Typical of the above situations is that form of releasable mechanical connection which involves a female or socket part and a male or pin part slidably engaged in the female part. In such situations and to prevent relative axial movement and separation of the male and female parts, the prior art has provided a multitude of different and varying types of retaining means, the commonest of which is a simple pin engaged through registering openings provided in the male and female parts on an axis normal to the direction of movement between said parts.

Another situation, similar to the above, is that type or form of mechanical connection wherein a male member in the form of a wedge or tapered pin is engaged in tight wedging engagement with a part having a tapered wedge or pin receiving opening or socket. In such means the wedging effect is frequently inadequate or undependable to maintain the parts assembled and separate or supplemental retaining means, such as retaining pins, engaged through registering openings in the parts or other suitable retaining means must be provided.

In other mechanical structures where wedges are urged between related surfaces of other parts or work or where sliding, bearing surfaces are provided on two relatively shiftable parts the provision of special gripping means to prevent or control movement and/or displacement of the related parts must frequently be provided.

The retaining means provided by the prior art have, for the most part, been characterized by rigid mechanical means or devices which are such that they require a multiplicity of parts and frequently require manual or mechanical manipulation or operation of the parts to effect connection and/or disengagement of the parts.

Simple gripping means, such as rubber friction pads, fixed to one of two related relatively movable parts and adapted to establish pressure friction engagement with the other part have been provided and have proven to be of considerable, but limited, success.

The rubber, compressible, friction type gripping means provided by the prior art are employed in those situations where the parts with which they are related need not or should not establish metal to metal contact and need not be positively, mechanically retained or locked together, but rather, should or need only be releasably and, preferably, yieldingly and resiliently retained or held together.

An object of the present invention is to provide a novel resilient retaining means to releasably retain a pair of elongate juxtapositioned axially shiftable parts together.

A further object of my invention is to provide a means of the character referred to which is such that it allows for relatively easy relative axial shifting of its related parts in one direction, as for the purpose of assembling said parts, but yieldingly resists and prevents relative axial shifting of said parts in the opposite direction, as might result in separation of said parts.

It is an object of my invention to provide a means of the character referred to which includes a simple, unitary, rubber part and the provision of a simple opening and recess in the parts with which it is related to hold and receive the rubber part.

An object of the invention is to provide a means of the character referred to which is such that the rubber part flows and is drawn in one direction or is compressed, flows and is drawn in said one direction in such a manner that when it is set between its related parts, it resists flow and drawing in the opposite direction.

An object of this invention is to provide a means of the character referred to which is such that when the rubber parts are compressed and/or drawn and flowed in one direction to a set condition and its related parts are urged and moved to cause it to flow or to be drawn in the opposite direction, the rubber mass of which the rubber part is established tends to build up, gather or accumulate in such a manner as to become compacted between the parts with which it is related and in such a manner as to bind and become compacted in a way so as to generate great or increased forces resisting such movement of said related parts.

Yet another object of this invention is to provide a means of the character referred to which is such that it does not require the parts with which it is related to establish close or direct bearing contact with each other and in such a manner that the rubber part is tightly compressed between said parts to establish great holding effect, but is such that considerable clearance, slop and/or play can exist between said related parts.

It is an object of the present invention to provide a means of the character referred to which is extremely easy and economical to manufacture, a means which is easy and economical to install and operate and a means which is rugged, durable and both highly effective and dependable in operation.

The foregoing and other objects and features of my invention will be fully understood from the following detailed description of typical preferred forms and applications of my invention, throughout which description reference is made to the accompanying drawings, in which:

FIG. 1 is a perspective view of a digger tooth and tooth holder assembly with my invention related thereto;

FIG. 2 is a sectional view taken as indicated by line 2—2 on FIG. 1;

FIG. 3 is a perspective view of the rubber part that I provide;

FIG. 4 is a sectional view showing the rubber part engaged with the tooth;

FIG. 6 is a view taken as indicated by line 6—6 on FIG. 4;

FIG. 5 is an enlarged detailed sectional view taken of a portion of the structure shown in FIG. 2;

FIG. 7 is an exploded perspective view of another form of my invention;

FIG. 8 is a view showing another form of my invention;

FIG. 9 is a perspective view of another form of the present invention;

FIG. 10 is a sectional view taken as indicated by line 10—10 on FIG. 9;

FIG. 11 is a view of the rubber part employed in the form of the invention shown in FIGS. 9 and 10;

FIGS. 12, 13 and 14 are views of modified forms of rubber gripping parts or members that can be employed in carrying out the present invention; and, FIG. 15 is a perspective view similar to FIG. 7 and showing another form of my invention.

In FIGS. 1 through 5 of the drawings I have shown my new retaining means A related to a digger tooth T engaged in a tooth holder H on a piece of earth moving equipment E.

The equipment E can be of any type or kind, for example, it can be a trencher, bulldozer, cultivator, or any other piece of earth moving or working equipment with which digger teeth are employed. Since the equipment E can be of any suitable kind or type, I have shown but a portion of such a piece of equipment with the holder H related to it.

The holder H is a simple metal block or box-like structure welded to the equipment E and has a front end 10 disposed in that direction in which the structure is moved when in use.

The holder H has a forwardly disposed opening 11 entering the front end 10. The opening 11 is rectangular in cross-section and has parallel side walls 12 and flat, rearwardly convergent top and bottom walls 14 and 15.

In practice, the opening 11 can extend through the block-like body of the holder to open rearwardly.

The tooth T is an elongate, unitary, metal part having a front, forwardly convergent earth-engaging blade portion 16 and a wedge shaped rear base portion 17.

The blade portion can be of any desired shape and extent.

The rear base portion 17 substantially corresponds in exterior configuration with the interior of the opening 11 in the holder H and has parallel side surfaces 18 adapted to oppose and slidably engage the side walls 12 of the holder H and flat, rearwardly convergent top and bottom wedging engagement with the top and bottom walls 14 and 15 of the holder, when the base or wedge portion of the surfaces 19 and 20 adapted to establish substantially flat, tooth is urged rearwardly into tight seated engagement in the opening 11 in the holder H.

The foregoing is a typical digger tooth and holder construction wherein the tooth is adapted to be urged into tight wedging engagement in its related holder for the purpose of retaining the tooth and holder assembled, but which, in practice, is extremely undependable.

The wedging action is, in such constructions, usually supplemented by other retaining means.

The retaining means A that I provide and which is clearly illustrated in FIGS. 2 through 5 of the drawings includes an opening 21 in the wedge or base portion 17 of the tooth T and extending from one surface 19 to the other surface 20; a recess 22 and a socket 23 in the surfaces 19 and 20 and a rubber gripper block B engaged in and through the opening and recesses.

The recess 22 and socket 23 have flat, bottom surfaces disposed upwardly and downwardly, respectively, which surfaces occur in opposing spaced relationship from the related top and bottom walls of the holder H when the tooth T is engaged in the holder H and the related surfaces and walls 19-14 and 20-15 are in bearing engagement with each other.

The opposite ends of the opening 21 communicate with or open at the bottoms of the recess 22 and socket 23. The recess 22 and socket 23 are substantially larger than the cross-section of the opening 21 and are so related to the opening 21 that they extend forwardly from their related ends of the opening 21 a substantial distance.

In practice, the opening 21 can be round or polygonal in cross-section. In the form of the invention now under consideration, the opening is round.

The recess 22 and socket 23 can be of any desired configuration and are shown as being substantially ovoid in plan configuration with their major dimensions or length extending longitudinally of the length or axis of the tooth structure.

The recess 22 and socket 23 are shown as having well defined sides. In practice, the sides of the recesses need not be so well defined, and, in fact, can be slightly inclined and suitably rounded or curved so that the recesses, from an appearance standpoint, are simple depressions in their related surfaces of the base portion 17 of the tooth T (see FIG. 15).

The rubber block B is a unitary molded rubber part. (It is to be understood that the term "rubber" is meant to include natural rubber or any suitable substitute or equivalent therefor.)

The block B includes an elongate body 30 having retaining means R at one end, which means is shown as involving a simple enlargement or head 31 and has a flat friction surface 32 at its other end, which surface is oblique to the central longitudinal axis of the body 30 and is adapted to be disposed rearwardly and either upwardly or downwardly relative to the longitudinal axis of the tooth. The block B is, therefore, an ungular block.

The body 30 of the block B is the same in cross-sectional shape and extent as the opening 21 in the tooth T and is slightly greater in longitudinal extent than said opening.

The retaining means or enlarged head 31 on one end of the body is preferably substantially the same in planned configuration as the socket 23 in the tooth and is preferably provided with a crowned or rounded outer surface 33 and so that the central portion of the head is greater in thickness than the depth of the socket 23 in the tooth and the peripheral portion of the head defines a thin tapered edge. The cross-sectional or volumetric extent of the head 31 is ideally equivalent to the cross-sectional or volumetric extent of the recesses.

The block is related to the tooth T by slidably engaging the body 30 thereof through the opening 21 in the block and until the head thereof is engaged and seated in the socket. It is to be noted that when the head is engaged in the socket, as set forth above, the central portion thereof projects outward from the socket.

The other or upper ungular end of the body projects freely from the opening 21, through the recess 22 and beyond the upper surface 19 of the tooth with its inclined friction surface 32 disposed wholly outside of the recess 22 and above the surface 19 and disposed rearwardly and outwardly relative to said surface 19.

The cross-sectional extent of that portion of the body 30 which projects from the bottom surface of the recess 22, which will hereinafter be referred to as "the gripping portion of the block," is less than the cross-sectional area of the recess 22 and the said recess 22 extends forwardly from the opening 21 a distance greater than the length of the gripping portion of the block whereby the gripping portion of the block is freely received in the recess 22 when it is bent forwardly and downwardly, as will hereinafter be described.

When the tooth T, with the block B related to it, is urged rearwardly into engagement in the opening 11 in the holder H, the upper tip end of the block B and the outermost part of the crowned outer surface 33 of the head initially engage their related walls 14 and 15 of the opening 11 in the holder H. Upon further rearward movement of the tooth T in the holder H, the upper gripper portion of the block B is bent forwardly and downwardly into the recess 22 and the friction surface 32 of the block is turned and disposed upwardly to establish substantially flat bearing frictional engagement on the upper wall 14 of the opening 11. At the same time, the head at the lower end of the body is compressed into the recess 23 and the outer surface thereof establishes pressure frictional engagement on the wall 15 of the opening 11 in the holder H. It is to be noted that in the preferred carrying out of the invention, where the cross-sectional area of the head 31 is equal to the cross-sectional area of the socket 23, when the tooth T is fully engaged in the holder opening 11, the rubber establishing the head 31 completely occupies the socket and is compacted into a substantially solid tight state.

The body 30 of the block B is greater in diametric extent than the depth of the recess 22 so that when the base portion 17 of the tooth is fully engaged in the holder H and the related walls and surfaces 14–19 and 15–20 are in metal to metal, tight wedging contact, the gripping portion of the block B is slightly compressed between the bottom of the recess 22 and the wall 19 in the holder opening 11.

When the tooth and holder are fully engaged in the manner set forth above, the head 31 of the block B is compressed and substantially fully occupies the socket 23 creating considerable frictional engagement on the wall 15 and further urges and holds the tooth tight against the wall 14 in the holder.

Should the tooth move forwardly relative to the holder so that the related surfaces and walls 19–14 and 20–15 are separated or moved out of pressure wedging contact with each other, the gripping portion of the block B continues to effectively retain the tooth in loose or working engagement in the holder and in such a manner that the tooth will not drop or otherwise move out of engagement from the holder, but will remain in position in the holder so that it can be easily reseated, as when the tooth is next moved into engagement with the earth.

Upon outward movement of the tooth in the holder H, the wall and surface 14 and 19 shift in the direction indicated by the arrows X and Y in FIG. 5 of the drawings. Such movement drags the gripping portion of the block rearwardly in the cavity or recess 22 and causes it to flow in such a manner as to build up upon itself since there is inadequate space between the said wall and surface to permit the gripper portion of the block to bend back or over. Such action is assured by the relatively large area of the friction surface 32 bearing on the wall 14 of the holder and results in the generation of greater or increased pressure exerted by the block on the wall 14.

The gripping portion of the block B will continue to function and hold the tooth and holder engaged until sufficient clearance is established between the wall 14 and surface 19 to permit the gripper portion of the block to bend or flip back in the opposite direction and between the said surface 19 and wall 14. A study of the drawings will clearly show that bending or flipping back of the gripper portion of the block B in the manner set forth above, could not take place as the tooth would have to be moved so far forward relative to the holder that the block would be forward of and out of engagement with the holder before sufficient clearance for reverse bending of the gripper portion could take place.

It is to be noted that when the tooth is urged into engagement in the holder, the gripper portion of the block body is drawn and but for the head 31, would be drawn out of engagement in the opening 21 and would be rendered ineffective or useless. Accordingly, the primary function of the head 31 is to retain the body 31 of the block B engaged in the tooth opening 21 and its function as a pressure generating and friction holding means is a secondary function which can be dispensed with, without departing from the spirit of the invention and which will be fully understood from the following.

It is to be noted that the recess 22 and socket 23 in the tooth T extend forwardly from the opening 21. Accordingly, the head 31 of the block B must extend forwardly from the body 30 of the block. With such a relationship of parts, it will be apparent that the head 31 serves as an orienting means for the block and prevents the block from being engaged in or with the tooth T with the friction surface 32 thereof disposed in an improper direction.

In the form of the invention shown in FIGS. 7 of the drawings the tooth T' is not provided with recesses, as in the first form of the invention. Rather, the top and bottom walls 14' and 15' of the opening 11' in the holder H' are provided with recesses 22' and 23' to accommodate the gripper portion and the head 31' of the block B'.

The body 31' of the block B' is shown as being square or polygonal in cross-section and the friction surface 32' is, therefore, rectangular in plane configuration.

The opening 21' in the tooth T' is polygonal or square to cooperatively receive the polygonal body of the block B.

The polygonal block body and the polygonal opening in this second form of the invention cooperate to prevent rotation of the block relative to the tooth T' and resulting misalignment of the friction surface of the block during normal handling and manipulation of the construction.

The head 31' is crowned to eliminate any edges or corners that could catch on or with the holder H' and impede assembly of the construction.

It will be apparent that this second form of the invention will function in substantially the manner as the first form of the invention, except that the spaces (recesses) provided to accommodate the head and gripper portions of the gripper block are provided in the holder rather than in the tooth, that is, in that part which the block is adapted to frictionally engage rather than that part which carries the block.

In FIG. 8 of the drawings I have shown my new gripper means related to a telescopically engaged tube and rod assembly whereby the rod $T^2$ is provided with a transverse opening $21^a$ to receive the body $30^a$ of the block $B^2$. The opening $21^a$ is provided with a counterbore or socket $23^a$ at one end to receive the retaining means $R^2$, that is, the head $31^a$ of the block, which is shown as a simple, cylindrical enlargement on one end of the body $30^a$. The side of the rod $T^2$ opposite the side in which the socket $23^a$ is located is suitably relieved, as by milling, to provide the necessary space or recess $22^a$ to accommodate the ungular gripper portion of the block, when the rod is urged into engagement with the tube $H^2$, as indicated by the arrow W.

The head $31^a$ in this form of the invention, if desired, establishes pressure, friction engagement on the inside surface of the tube to enhance or supplement the gripping action of the ungular gripping portion of the block $B^2$.

FIG. 9 illustrates another application of my new gripping means. In this application of the present invention, the gripper block $B^3$ is related to a pair of relatively shiftable, flat, horizontally disposed plates P and P', such as guide plates on two relatively shiftable assemblies of a machine and between which yielding resistance to separation is desirable or required. The plates P and P' are provided with upwardly and downwardly disposed opposing surfaces 40 and 41 adapted to shift relative to each other in the direction indicated by the arrow W'. The upwardly disposed surface of the plate 40 is provided with an elongate recess 22$^b$ extending parallel with the line of direction of travel of the plates P and P' and a vertical opening 21$^b$ through the plate at the forward end of the recess, that is, at that end of the recess which first meets the surface 41 when the plates are shifted into engagement with each other. The gripper block B$^3$, is similar to the gripper blocks in the preceding forms of the invention and is engaged through the opening 21$^b$ with its ungular gripping portion normally projecting upwardly from the opening 21$^b$ and through the recess 22$^b$. The gripper block B$^3$ has an enlarged retaining head 31$^b$ at its lower end engaging the bottom surface of the plate 40, about the opening 21$^b$ and serves to prevent vertical shifting and displacement of the block B$^3$ from the opening 21$^b$ when the assembly is made up.

The retaining head 31$^b$ in this form of the invention consists of a flat, annular washer 45 engaged in and about an annular, radially outwardly opening groove 46 in the lower end of the block body 30$^b$ and projecting radially outwardly therefrom to define a stop shoulder.

It will be apparent that the gripping means in the structure shown in FIG. 9, FIG. 10 and FIG. 11 will function in essentially the same manner as the gripping means in each of the previously considered forms of the invention.

FIGS. 12, 13 and 14 show three modified forms of retainer blocks with distinct retaining means or heads. In FIG. 12 the retaining means R$^3$ or head consists of a screw fastener 50 with its threaded shank 51' bonded in the lower portion of the body 30$^c$ of the block B$^3$. In FIG. 13 the retaining means R$^4$ involves a malleable metal tab 52 with one end bonded in the lower end portion of the block body 30$^d$ and its other end portion projecting from the body and adapted to be bent or suitably formed to engage a related piece of work and retain the block in a related block receiving opening in said piece of work. In FIG. 14 of the drawings the retaining means R$^5$ consists of a transverse opening in the lower portion of the block body 30$^e$ and a retaining pin 53 engaged through said opening.

While I have, in the several forms of the invention shown in FIGS. 1 through 8 of the drawings, shown in the gripping block of my new improved gripping means carried by a male member and engaging the interior of a related female member, it will be apparent that, in practice, the gripping block can be advantageously carried by the female member to engage the related male member, without departing from the spirit of this invention. In FIG. 15 of the drawings, such a relationship of parts is clearly illustrated.

In FIG. 15 of the drawings I have illustrated the above noted reverse relationship of parts and have shown the female member or holder H$^6$ provided with or carrying two opposing blocks B$^6$, the ungular gripper portions of which project into the opening 11$^f$ in the holder to engage the wedge shaped male member T$^6$. The male member T$^6$ is provided with recesses 22$^6$ and 23$^6$ to accommodate the gripper portions of the block.

The blocks B$^6$ in this form of the invention are that form of block shown in FIG. 13 of the drawings.

Having described only typical preferred forms and applications of my invention, I do not wish to be limited to the specific details herein set forth, but wish to reserve to myself any modifications and/or variations that may appear to those skilled in the art.

Having described my invention, I claim:

1. A resilient gripping means to yieldingly prevent relative movement between two relatively shiftable parts along a predetermined line of travel including an opening in one part substantially normal to said line of travel, an elongate rubber block engaged in said opening and having an ungular gripping portion at one end and projecting outwardly from said one part with its oblique end surface disposed outwardly and longitudinally in one direction along said line of travel, said gripping portion adapted to be engaged by the other part upon movement of said other part in the other direction along said line of travel relative to said first part whereby said end portion is bent over between said parts and said end surface establishes substantially flat pressure frictional engagement on said other part and yieldingly resists movement of said other part in said one direction relative to said one part, and retaining means at the other end of the block and normally extending radially relative to the longitudinal axis thereof and releasably engaging said one part to prevent movement of the block outwardly from said opening.

2. A structure as set forth in claim 1 wherein said parts have opposing surfaces, said opening being substantially normal to and entering the said surface of said one part in which it is established and opening toward said surface of the other part.

3. A structure as set forth in claim 1 wherein said parts have opposing surfaces, said opening being substantially normal to and entering the said surface of said one part in which it is established and opening toward said surface of the other part, said retaining means including an enlarged head at said other end of the block and located longitudinally outward from the opening.

4. A structure as set forth in claim 1 wherein said parts have opposing surfaces, said opening being substantially normal to and entering the said surface of said one part in which it is established and opening toward said surface of the other part, said opposing surfaces adapted to establish sliding bearing engagement with each other, one of said surfaces being relieved to accommodate the ungular gripping portion of the block between the parts when said portion of the block is bent over.

5. A structure as set forth in claim 1 wherein said parts have opposing surfaces, said opening being substantially normal to and entering the said surface of said one part in which it is established and opening toward said surface of the other part, said opposing surfaces adapted to establish bearing engagement with each other, one of said surfaces being relieved to accommodate the ungular gripping portion of the block between the ports when said portion of the block is bent over, said retaining means including an enlargement at the other end of the block located outside said opening remote from the said surface thereof and adapted to prevent movement of the block outwardly from said opening.

6. A structure as set forth in claim 1 wherein said parts have opposing surfaces, said opening being substantially normal to and entering the said surface of said one part in which it is established and opening toward said surface of the other part, said surface of said one part having an outwardly opening recess extending longitudinally of said line of travel and in said other direction relative to said opening and adapted to receive the ungular portion of the block when it is bent over.

7. An elongate female part with front and rear ends and a forwardly opening longitudinally extending opening in said part, an elongate male member with front and rear ends and shiftable axially rearwardly into engagement in the opening in the female part and resilient gripping means to yieldingly prevent axial forward movement of the male part relative to the female part including a transverse opening in the male part, a socket in said male part at one end of said transverse opening, an elongate rubber block engaged through the opening and having a retaining head at said end engaged in said socket and an ungular gripping portion at its other end and normally projecting laterally outward of the male member with an oblique end surface disposed outwardly and longitudinally rearwardly, said gripping portion adapted to be engaged and bent forwardly relative to the male part by the female part when the male part is urged rearwardly into engagement in the female part whereby the end surface establishes substantially flat bearing engagement on the wall of the opening in the female member.

8. A structure as set forth in claim 7 wherein said male member has an outwardly opening recess extending longitudinally forwardly from the end of the opening in the male member from which the gripping portion projects to receive the gripping portion of the block when the said portion is bent forwardly.

9. A structure as set forth in claim 7 wherein said male member has an outwardly opening recess extending longitudinally forwardly from the end of the opening in the male member from which the gripping portion projects to receive the gripping portion of the block when the said portion is bent forwardly, said recess being shallower than the cross-sectional dimension of the gripping portion whereby said gripping portion would normally project outwardly by the recess when it is bent over into the recess and is compressed between the male and female parts when it is bent over into the recess and between said parts.

10. A structure as set forth in claim 7 wherein said male member has an outwardly opening recess extending longitudinally forwardly from the end of the opening in the male member from which the gripping portion projects to receive the gripping portion of the block when the said portion is bent forwardly, the socket in said male member defining an outwardly disposed stop surface, said retaining head defining an inwardly disposed stop shoulder engaging said stop surface.

11. A structure as set forth in claim 7 wherein said male member has an outwardly opening recess extending longitudinally forwardly from the end of the opening in the male member from which the gripping portion projects to receive the gripping portion of the block when the said portion is bent forwardly, the socket in said male member defining an outwardly disposed stop surface, said retaining head defining an inwardly disposed stop shoulder engaging said stop surface, said retaining head being no greater in volume than the volumetric extent of the socket and normally projecting therefrom, whereby said head establishes yieldingly pressure and frictional engagement in the opening in the female part.

12. A structure as set forth in claim 7 wherein said male member has an outwardly opening recess extending longitudinally forwardly from the end of the opening in the male member from which the gripping portion projects to receive the gripping portion of the block when the said portion is bent forwardly, said recess being shallower than the cross-sectional dimension of the gripping portion whereby said gripping portion would normally project outwardly by the recess when it is bent over into the recess and is compressed between the male and female parts when it is bent over into the recess and between said parts, said socket in the male member defining an outwardly disposed stop surface, said retaining head defining an inwardly disposed stop shoulder engaging said stop surface, said retaining head being no greater in volume than the volumetric extent of the socket and normally projecting therefrom, whereby said head establishes yieldingly pressure and frictional engagement in the opening in the female part.

References Cited
UNITED STATES PATENTS

| | | |
|---|---|---|
| 3,057,091 | 10/1962 | Petersen. |
| 3,246,930 | 4/1966 | Krekeler. |
| 3,286,378 | 11/1966 | Benetti. |
| 3,334,431 | 8/1967 | Phillips. |

ANTONIA F. GUIDA, Primary Examiner

ALAN E. KOPECKI, Assistant Examiner

U.S. Cl. X.R.

279—102; 287—126; 299—92; 306—20